(12) United States Patent
Kubota et al.

(10) Patent No.: US 9,801,105 B2
(45) Date of Patent: Oct. 24, 2017

(54) METHOD AND APPARATUS FOR MANAGING MEASUREMENT EVENT TRIGGER CRITERIA

(71) Applicant: AVAGO TECHNOLOGIES GENERAL IP (SINGAPORE) PTE. LTD., Singapore (SG)

(72) Inventors: Keiichi Kubota, Weybridge (GB); Brian Martin, Farnham (GB); Christopher Callender, Cleish (GB)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 540 days.

(21) Appl. No.: 14/273,965

(22) Filed: May 9, 2014

(65) Prior Publication Data

US 2014/0335868 A1    Nov. 13, 2014

(51) Int. Cl.
*H04W 36/00*  (2009.01)
*H04W 24/10*  (2009.01)

(52) U.S. Cl.
CPC ....... *H04W 36/0088* (2013.01); *H04W 24/10* (2013.01)

(58) Field of Classification Search
None
See application file for complete search history.

(56) References Cited

U.S. PATENT DOCUMENTS

| | | | |
|---|---|---|---|
| 2011/0170418 A1 | 7/2011 | Saagfors et al. | |
| 2012/0044818 A1 | 2/2012 | Lindoff et al. | |
| 2012/0281544 A1* | 11/2012 | Anepu | H04B 7/0632 370/241 |
| 2013/0114418 A1* | 5/2013 | Kubota | H04W 24/10 370/248 |
| 2013/0231118 A1* | 9/2013 | Whinnett | H04W 36/30 455/444 |

FOREIGN PATENT DOCUMENTS

| | | |
|---|---|---|
| EP | 2574095 | 3/2013 |
| GB | 2482869 | 2/2012 |

* cited by examiner

*Primary Examiner* — Suhail Khan
(74) *Attorney, Agent, or Firm* — Oblon, McClelland, Maier & Neustadt, L.L.P.

(57) ABSTRACT

A method for a user equipment (UE) to manage measurement event trigger criteria including determining a first pathloss for a serving cell and a second pathloss for at least one neighbor cell; adjusting the measurement event trigger criteria based on at least one of the determined first pathloss, the determined second pathloss and a weight factor X received from the serving cell; and triggering a measurement event based on the adjusted measurement event trigger criteria.

20 Claims, 4 Drawing Sheets

METHOD AND APPARATUS FOR MANAGING MEASUREMENT EVENT TRIGGER CRITERIA

TECHNICAL FIELD

An example embodiment of the present invention relates generally to wireless communications, and, more particularly, to managing measurement event trigger criteria.

BACKGROUND

Heterogeneous networks arose due to the rapid increase of numbers of mobile subscribers and demand for bandwidth, and the inadequacy of traditional macro base stations in meeting subscriber requirements. Homogenous networks consisting of solely traditional macro base stations may have blind spots in coverage that adversely impact user experience. With the introduction of lower power base stations, including pico cells, femto cells, and relay nodes, newer generation of wireless network topology such as that of a LTE-A network becomes a heterogeneous network (HetNet) that is able to deliver more complete coverage and to support diverse types of wireless devices. In a HetNet as defined in 3GPP, low power nodes (LPNs), such as RRU/RRH, pico eNB (Enhanced Node B), home eNB, and relay node, are deployed inside or next to the macro base station or enhanced node B coverage cell.

One consequence related to the heterogeneous network deployment where small-power nodes are being placed in a high-power macro-cell layout is an uplink (UL) power imbalance caused by the transmit power difference between the small power nodes and macro-cell. Simulation results illustrate three potential problems arising from the uplink power imbalance: (1) unreliable HS-DPCCH decoding at the serving cell; (2) excessive UL interference from the macro-cell to low power node; and (3) excessive UL interference from the low power nodes to a macro cell. Similar issues could be expected for LTE HetNet, i.e., unreliable PDCCH decoding, and excessive UL interference from both macro or pico nodes. Various coordination techniques have been proposed for dealing with this interference in LTE specifications such as feICIC, however these may not be used in all networks since time domain interference coordination creates a requirement that the aggressor and victim cell are synchronized. Therefore, it is desired to have a measurement and reselection mechanism that can take into account the pathloss between the UE and a macro cell and between the UE and a pico cell in order to minimize or avoid interferences.

The following abbreviations are used in this application.
AIL Acceptable Interference Level
BS Base Station
CPICH Common Pilot Channel
CRE Cell Range Expansion
DL Downlink
DPCCH Dedicated Physical Control Channel
E-DCH Enhanced Data Channel
EUTRAN Enhanced UTRAN
eICIC Enhanced Inter-Cell Interference Coordination
eNB Enhanced Node B.
FDD Frequency Division Duplex
HS-DPCCH High Speed-Dedicated Physical Control Channel
LP Lower Power
LTE Long Term Evolution
OAM Operation, Administration and Maintenance
PDCCH Physical Downlink Control Channel
PDSCH Physical Downlink Shared Channel
PRB Physical Resource Block
RCC Radio Resource Control
RLC Radio Link Control
RNTP Relative Narrowband Tx Power
RRC Radio Resource Control
RSRP Reference Signal Receiving Power
RSRQ Reference Signal Received Quality
RRU/RRH Remote Radio Unit/Remote Radio Head
Rx Receive
RSCP Received Signal Code Power
RSSI Received signal strength indicator
TDD Time Division Duplex
Tx Transmit
UE User Equipment
UMTS Universal Mobile Telecommunications System
UTRAN UMTS Radio Access Network
WCDMA Wideband Code Division Multiple Access

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

In accordance with an example embodiment of the present invention, a method is provided for a user equipment (UE) to manage measurement event trigger criteria. The method comprises determining a first pathloss for a serving cell and a second pathloss for at least one neighbor cell; adjusting the measurement event trigger criteria based on at least one of the determined first pathloss, the determined second pathloss and a weight factor X received from the serving cell; and triggering a measurement event based on the adjusted measurement event trigger criteria.

In accordance with an example embodiment of the present invention, an apparatus is provided for use in a user equipment (UE) to manage measurement event trigger criteria. The apparatus comprises a processing system, which may be configured by a processor and at least one memory storing program instructions. The processing system is configured to determine a first pathloss for a serving cell and a second pathloss for at least one neighbor cell; adjust the measurement event trigger criteria based on at least one of the determined first pathloss, the determined second pathloss and a weight factor X received from the serving cell; and trigger a measurement event based on the adjusted measurement event trigger criteria.

In accordance with another example embodiment of the present invention, a method is provided for a base station to manage measurement event trigger criteria for a HetNet deployment. The method comprises determining a pathloss between a pair of neighbor cells associated with the base station and a weight factor for an uplink coverage; determining an adjustment to existing measurement trigger criteria based at least on the determined pathloss; and sending the adjusted measurement trigger criteria to at least some of the UEs associated with the base station.

In accordance with another example embodiment of the present invention, there is provided an apparatus for use in a base station to manage measurement event trigger criteria for a HetNet deployment. The apparatus comprises a processing system configured to determine a pathloss between a pair of neighbor cells associated with the base station and a weight factor for an uplink coverage; determine an adjustment to existing measurement trigger criteria based at least on the determined pathloss; and send the adjusted measurement trigger criteria to at least some of the UEs associated with the base station.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. As used herein, the terms "data," "content," "information," and similar terms may be used interchangeably to refer to data capable of being transmitted, received and/or stored in accordance with embodiments of the present invention. As used herein, the terms "active cell," and "serving cell" may be used in alternative to each other to refer to a cell to which an UE is connected via a wireless connection. Likewise, as used herein, the terms "base station," "active eNB" and "serving eNB" may be used interchangeably to refer to either a base station of a cellular network alone or a combination of a radio network controller (RNC) and a base station of a cellular network, depending on a specific wireless network context. Also as used herein, the term "measurement event trigger criteria" and "measurement event trigger parameters" and similar terms, as used in a general context, may be used interchangeably to refer to the conditions for triggering a measurement for handover preparation. Thus, use of any such terms should not be taken to limit the spirit and scope of embodiments of the present invention.

Figure 1:
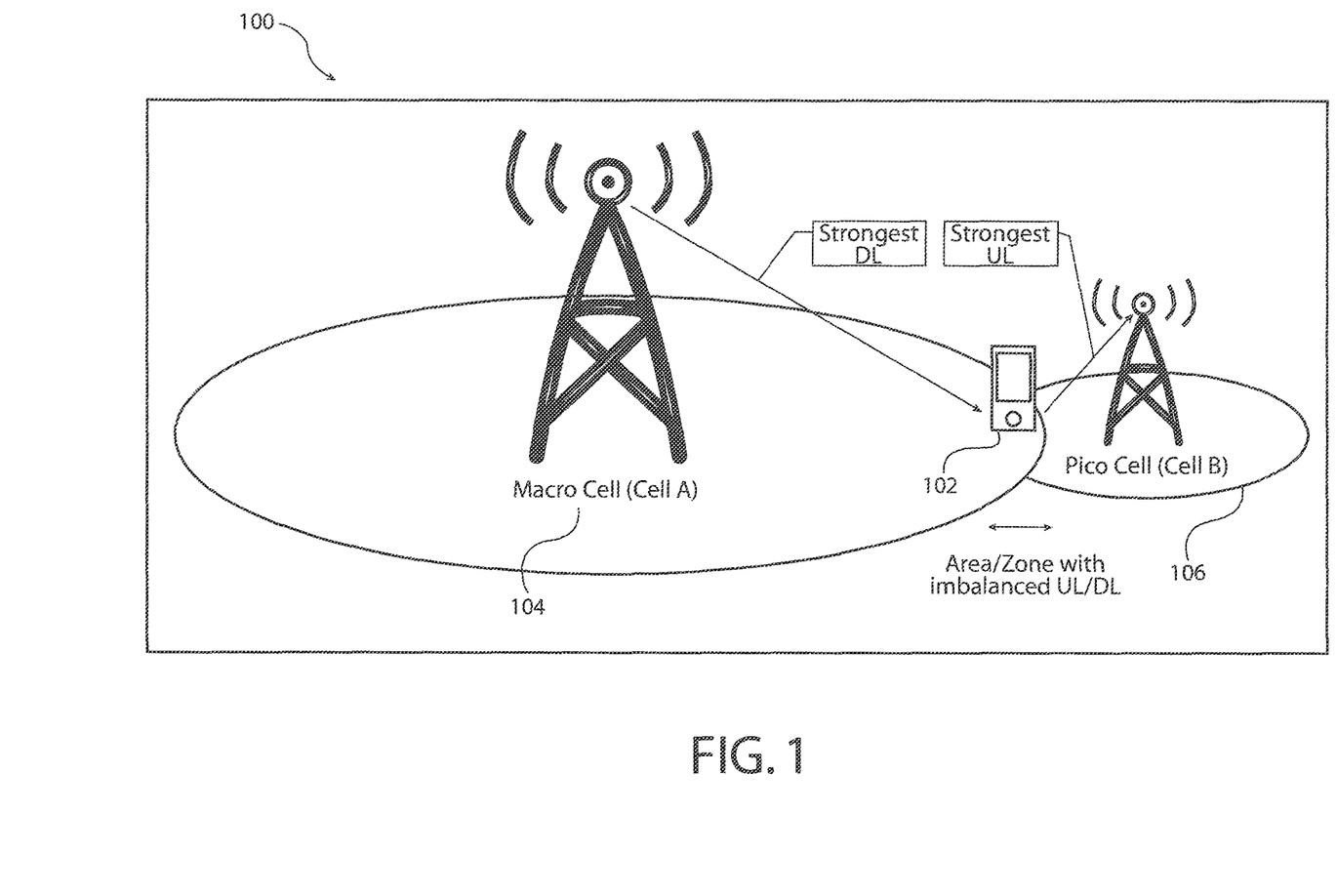
FIG. 1 illustrates an example wireless network in accordance with an example embodiment of the invention.

Referring now to FIG. 1, an example wireless network 100 is provided in accordance with an example embodiment of the invention. The wireless network 100 may include a macro cell 104, a pico cell 106 and a user equipment (UE) 102 which is located in the coverage areas of both the macro cell 104 and the pico cell 106. More specifically, the UE 102 is located relatively far from the macro cell 104 and relatively closer to the pico cell 106. Due to much smaller output power of the pico cell 106, the UE 102 may determine that the macro cell 104 meets the relevant measurement event trigger criteria, based on the measured DL power. However, due to being relatively far from the macro cell 104, the UE 102 needs to use a high uplink power to communicate with that cell, which may cause excessive interference to the nearby pico cell 106. In this particular deployment as shown in FIG. 1, the UE may be said to be in an "imbalance zone."

In one embodiment, the UE 102, instead of performing measurements based on legacy measurement event trigger criteria that are mainly based on the downlink coverage when performing measurement evaluation, may make an adjustment to the legacy measurement event trigger criteria, taking into account the pathloss for the uplink between the UE 102 and the macro cell 104 and the pathloss for the uplink between the UE 102 and the pico cell 106. As result of the adjustment to the measurement trigger criteria, the UE 102 may find that the measurement event trigger criteria are met for the uplink between the UE 102 and the pico cell 106 and a link quality measurement is then performed. As a result, the UE may report to the pico cell 106 instead of the macro cell 104, if the downlink is still of reasonable quality even if it is not the best cell according to traditional measurement event evaluation criteria.

In an alternative embodiment where the UE 102 is a legacy UE, the base station (not shown) associated with the macro cell 104 may determine a pathloss between the macro cell 104 and the pico cell 106 and then determine an adjustment to the measurement event trigger criteria, taking into account the determined pathloss and then send the adjusted measurement event trigger criteria to the UE 102. The UE 102 may perform a measurement based on the adjusted measurement event trigger criteria and as a result, the UE 102 may report to the pico cell 106 instead, if the UE 102 is in an "imbalance zone" as shown in FIG. 1 and the downlink is still of reasonable quality.

Figure 2:
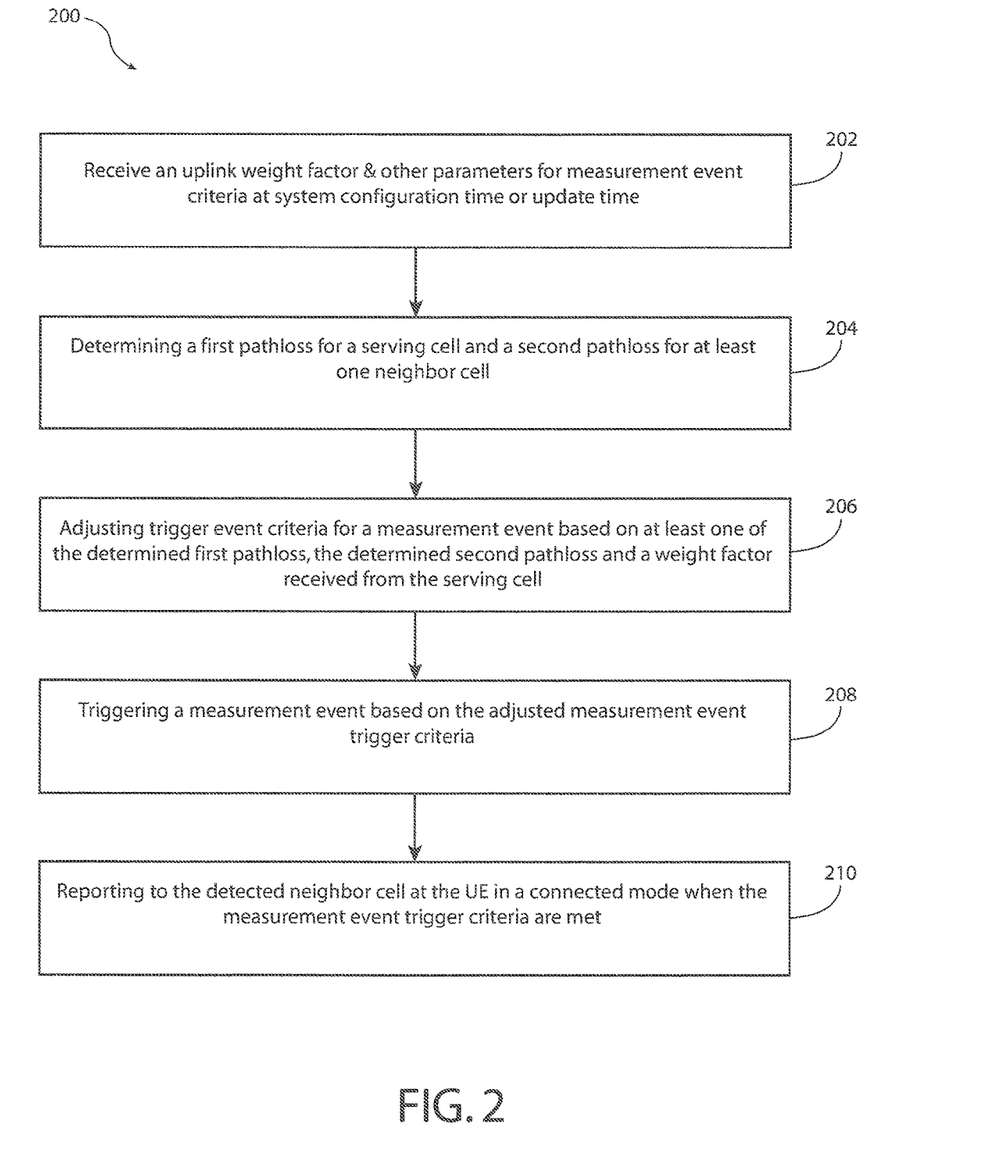
FIG. 2 illustrates an example method for a UE to adjust measurement event trigger criteria in a HetNet environment in accordance with an example embodiment of the invention.

FIG. 2 illustrates an example method 200 for a UE to perform a measurement event in accordance with an example embodiment of the invention. The method 200 may include receiving an uplink weight factor and other parameters for measurement event criteria at step 202, determining a first pathloss for a serving cell and a second pathloss for at least one neighbor cell at step 204, and adjusting measurement event trigger criteria for a measurement event based in part on the determined pathlosses at step 206. The method 200 may also include triggering a measurement event based on the adjusted measurement event trigger criteria at step 208 and reporting to the detected neighbor cell in a connected mode when the measurement event trigger criteria are met at step 210.

In example embodiment, receiving an uplink weight factor and other parameters for measurement event criteria at step 202 may include the UE receiving a weight factor via a downlink control channel. The UE may receive the weight factor when it first enters the coverage area of the macro cell 104 via a broadcast message or a dedicated signaling message along with other measurement event trigger parameters. The measurement event trigger parameters may include a cell Received signal strength indicator (RSSI) & Common Pilot Channel (CPICH) Received Signal Code Power (RSCP) or a CPICH En/lo, among others. CPICH Ec/No represents the received energy per chip divided by the power density in the band and may be identical to RSCP/RSSI if measurement is performed on the primary CPICH and the reference point for Ec/No is set to the antenna connector at the UE. The weight factor may be updated semi-statically or dynamically along with other measurement event trigger parameters or independently. The weight factor may be a positive number valued between 0 and 1 and may indicate a level of importance of the uplink link from the serving cell's perspective, taking into consideration a number of factors such as traffic condition on the link and a measured pathloss for the UE, and a desired service quality, among others.

In one example embodiment, determining a first pathloss for the serving cell at step 204 may include calculating a power difference between a CPICH Transmission Tx power and a CPICH-received power, wherein the CPICH TX power is broadcast from the serving cell as part of a neighbor list update and the CPICH received power is measured at the UE if the serving cell is a WCDMA cell. In another example embodiment, if the serving cell is a LTE cell, determining the first pathloss for the serving cell may include calculating a power difference between a reference-signal power and a Reference Signal Receiving Power (RSRP) wherein the RSRP is an average power of Resource Elements (RE) that carry cell specific Reference Signals (RS) over an entire bandwidth measured at the UE.

In one example embodiment, determining the pathloss for at least one neighbor cell at step 204 may include calculating a power difference between a CPICH Tx Power and a CPICH received power if the neighbor cell is a WCDMA cell, or calculating a power difference between a reference-signal power and a RSRP if the neighbor cell is a LTE cell.

In one example embodiment, adjusting trigger criteria at step 206 may include factoring into the criteria a product of the weight factor and pathloss, i.e., $x*PL_{best}$ where x is the received weight factor and $PL_{best}$ is the calculated pathloss as described at step 204. In one example embodiment, a resulting measurement event trigger criteria is defined by $$10 \cdot \text{Log } M_{NotBest} + CIO_{NotBest} + x*PL_{NotBest} \geq 10 \cdot \text{Log } M_{Best} + CIO_{Best} + x*PL_{Best} + H_{1d}/2,$$

where $M_{NotBest}$ is a measurement result of a cell not stored in "best cell" in the variable BEST_CELL_1D_EVENT, $CIO_{NotBest}$ is a cell individual offset of the cell not stored in "best cell" in the variable BEST_CELL_1D_EVENT. $M_{Best}$ is a measurement result of the cell stored in "best cell" in the variable BEST_CELL_1D_EVENT, $CIO_{Best}$ is the cell individual offset of the cell stored in "best cell" in the variable BEST_CELL_1D_EVENT, $H_{1d}$ is the hysteresis parameter for an event 1d.

In one example embodiment, if the serving cell is an LTE cell, adjusting measurement event trigger criteria at step 206 may include factoring into the trigger criteria the weight factor and the calculated pathloss, i.e. $x*PL_{best}$ and the adjusted measurement event trigger criteria for an LTE A3 event becomes:

$$Mn+Ofn+Ocn-Hys+x*PLn>Mp+Ofp+Ocp+Off++x*PLp$$

In one example embodiment, the adjusted measurement event trigger criteria for the LTE A3 may become Mn+Ocn−Hys+x*PLn>Ms+Ocs+Off+x*PLn, where Mn is the measurement result of the neighboring cell, not taking into account any offsets, Ofn is a frequency specific offset of the frequency of the neighbor cell (i.e. offsetFreq as defined within measObjectEUTRA corresponding to the frequency of the neighbor cell). Ocn is the cell specific offset of the neighbour cell (i.e. cellIndividualOffset as defined within measObjectEUTRA corresponding to the frequency of the neighbor cell), and set to zero if not configured for the neighbor cell. Mp is the measurement result of the PCell, not taking into account any offsets; Ofp is the frequency specific offset of the primary frequency (i.e. offsetFreq as defined within measObjectEUTRA corresponding to the primary frequency). Ocp is the cell specific offset of the PCell (i.e. cellIndividualOffset as defined within measObjectEUTRA corresponding to the primary frequency), and is set to zero if not configured for the PCell. Off is the offset parameter for this event (i.e. a3-Offset as defined within reportConfigEUTRA for this event). Hys is the hysteresis parameter for this event (i.e. hysteresis as defined within reportConfigEUTRA for this event), is an offset parameter for this event (i.e. a3-Offset as defined within reportConfigEUTRA for this event). Mn and Mp are expressed in dBm in case of RSRP, or in dB in case of RSRQ, and Ofn, Ocn, Ofp, Ocp, Hys, Off are expressed in dB as well.

In another example embodiment, adjusting trigger criteria for a measurement event at step 206 may include applying a second factor X*PL to a second uplink carrier if the UE supports a 2-uplink carrier aggregation comprising a primary frequency and a secondary frequency. The second uplink carrier can be of the same frequency as the primary frequency and then measurement is of an intra-frequency one. The second uplink carrier may also be a different frequency and thus the measurement is of an inter-frequency one. Adjusting measurement event trigger criteria at step 206 may also include taking into account other additional measurement parameters such as a measured uplink interference, and the neighbor list is updated using network co-ordinated values which may be obtained from the neighbor cell system information.

In one example embodiment, triggering a measurement event at step 208 may include checking the adjusted event trigger criteria at a fixed or dynamic interval, and performing a measurement when the adjusted measurement event trigger criteria are met. Triggering a measurement event at step 208 may also include the UE setting up measurements for each measurement type in a connected mode. For each measurement type, one or more measurement objects may be defined for each carrier frequency. In one example embodiment, the measurement is performed on an inter-frequency carrier and in another example embodiment, the measurement carried on an intra-frequency carrier.

In one example embodiment, reporting to the detected neighbor cell at step 210 may include evaluating measurement reports and deciding to report to the neighbor cell instead of the current serving cell, based on the measurements taken at step 208. In one example embodiment, because of a relative low pathloss value for the UE and the detected neighbor cell which happens to be a pico cell, the UE may start reporting performance measurements to the pico cell instead. A relatively lower pathloss indicates that the distance between the pico cell and the UE is relatively shorter compared to the distance between the UE and the currently serving macro cell.

Figure 4:
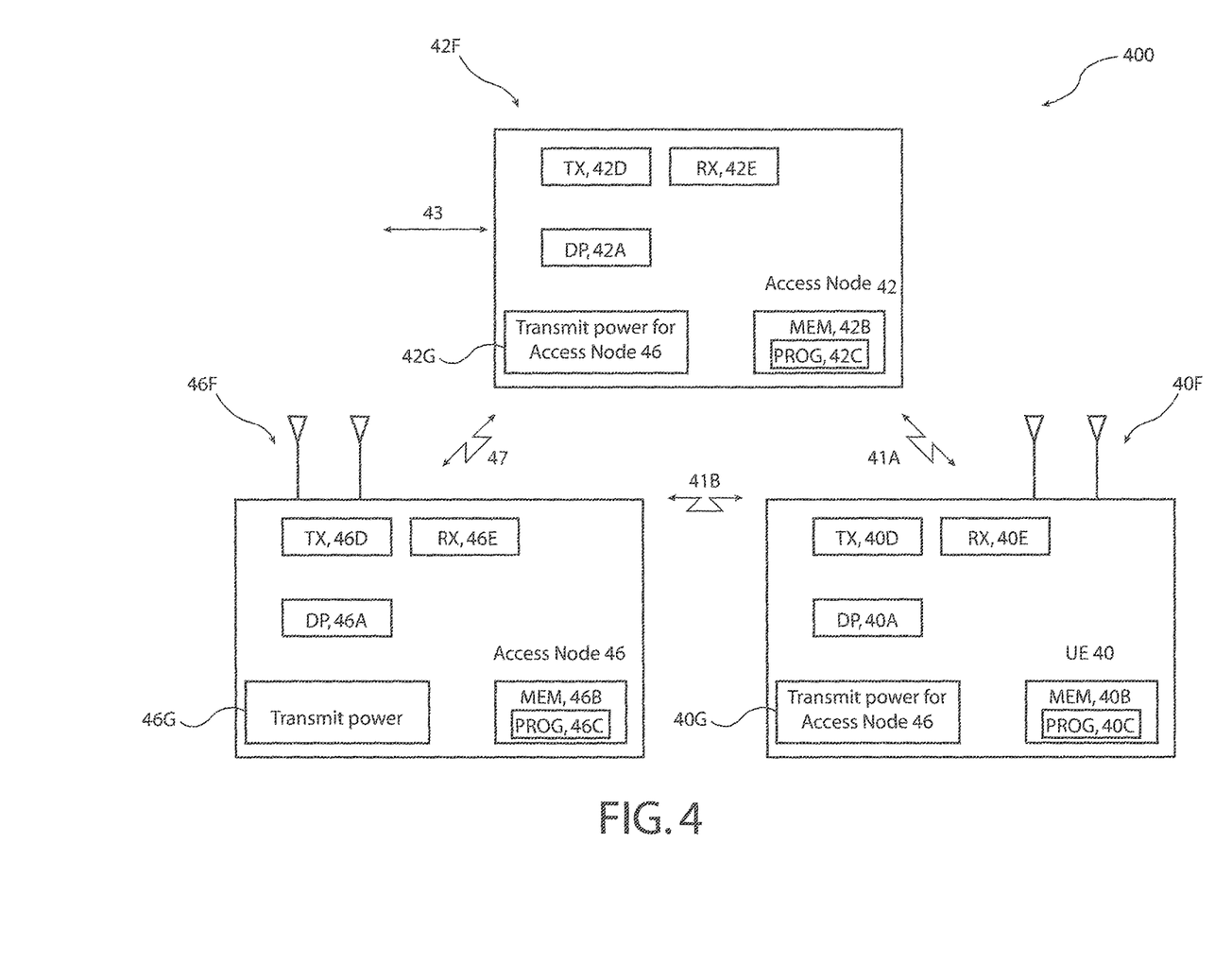
FIG. 4 illustrates an example wireless system in accordance with an example embodiment of the invention.

In one example embodiment, the method 200 may be implemented at the UE 102 of FIG or the access node 46 of FIG. 4. The method 200 is for illustration only and the steps of the method 200 may be combined, divided, or executed in a different order than illustrated, without departing from the scope of the invention of this example embodiment.

Figure 3:
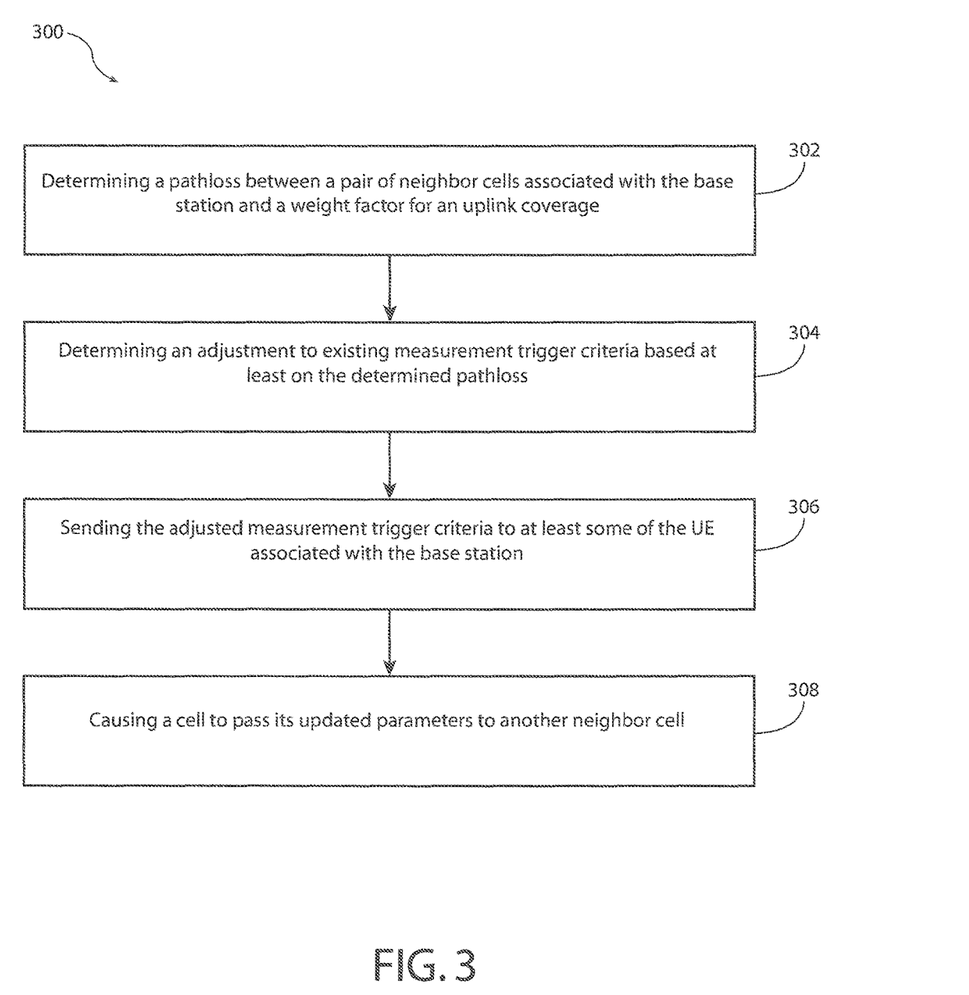
FIG. 3 illustrates an example method for macro base station to adjust measurement event trigger criteria in a HetNet environment in accordance with an example embodiment of the invention.

FIG. 3 illustrates an example method 300 for a base station to adjust measurement event trigger criteria in an environment such as a HetNet deployment. The method 300 may include determining a pathloss between a pair of neighbor cells associated with the base station and a weight factor for an uplink coverage at step 302, determining an adjustment to existing measurement event trigger criteria based at least on the determined pathloss at step 304, sending the adjusted measurement trigger criteria to at least some of the UE associated with the base station at step 306 and causing a cell to pass its updated parameters to another neighbor cell at step 308.

In one example embodiment, determining a pathloss between a pair of neighbor cells at step 302 may include estimating the UE uplink signal received at an associated base station, comparing the uplink signals between the neighbor cells to determine which cell to report or trigger measurement events, and taking into account downlink based on a current measurement evaluation. In one example embodiment, determining the weight factor at step 302 may include using a default weight factor that is determined previously or configured at a system configuration time.

Determining the weight factor at step 302 may also include updating the weight factor based on uplink powers, known or measured coverage, past or current interference, traffic conditions of the uplink, quality of service requirement for a current service on the uplink, among other factors.

In one example embodiment, determining an adjustment to existing measurement event trigger criteria at step 304 may include calculating the power difference based at least on the determined pathloss between the two neighbor cells and factoring the pathloss into the event trigger criteria, in a fashion similar to that as described for steps 204 and 206 of FIG. 2. For example, the base station may determine a pathloss based on a power difference between the macro cell 104 and the pico cell 106 and factor the pathloss in the adjustment to the measurement event trigger criteria.

In one example embodiment, sending the adjusted measurement event trigger criteria to at least some of the UE associated with the base station at step 306 may include sending the adjusted parameters to those new UEs using measurement event specific or extended CELL_INFO_LIST, the UEs that are configured to adjust measurement event trigger criteria themselves. In an alternative embodiment, the base station may send the adjusted measurement trigger criteria to all associated UEs included in system information. Those UEs may include legacy UEs that are not configured to adjust measurement event trigger criteria themselves. This may enable a legacy UE to use the adjusted measurement event trigger criteria and cause the UE to report to a relative closely located pico cell rather than a serving macro cell in a deployment scenario similar to the one shown in FIG. 1.

In one example embodiment, causing a cell to pass its adjusted measurement event trigger criteria to a neighbor cell at step 308 may include the base station sending the trigger criteria to a first cell in a control signaling message and including in the signaling message an indicating that the first cell is to pass the received trigger criteria to a neighbor cell. The first cell may broadcast the trigger criteria to all neighbor cells within the coverage to synchronize on the trigger criteria or send the trigger criteria via a designated signaling channel. The neighbor cell may then send the adjusted trigger criteria to some or all of the associated UEs.

In one example embodiment, the method 300 may be implemented at the macro base station 104 of FIG. 1 or the access node 42. The method 300 is for illustration only and the steps of the method 300 may be combined, divided, or executed in a different order than illustrated, without departing from the scope of the invention of this example embodiment.

Reference is now made to FIG. 4 for illustrating a simplified block diagram of a wireless network deployment scenario 400 with various electronic devices and apparatus that are suitable for use in practicing the exemplary embodiments of this invention. The wireless network deployment scenario may include an Access Node 42, another Access Node 46 and a UE 40. Access Node 42 and Access Node 46 are adapted for communication over a wireless link 41A and another wireless link 47 with an apparatus, such as the mobile terminal or UE 40. The Access Node 42 may be any access node such as a node-B or an enhanced-node-B (including frequency selective repeaters) of any wireless network using licensed bands, such as LTE and the Access node 46 may be a low-power node such as a pico cell, a femto cell, or a relay node.

The UE 40 is operating in a cell wherein Access Node 42 is the serving cell. UE 40 includes processing means such as at least one data processor (DP) 40A, storing means such as at least one computer-readable memory (MEM) 40B storing at least one computer program (PROG) 40C, first communication means such as a transmitter TX 40D and a receiver RX 40E for bidirectional wireless communications with the Access Node 42 or Access Node 46 on a RAT. All of these wireless communications are via one or more antennas 40F. UE 40 is also operable to receive and store the reference signal transmit power of neighbor cell Access Node 46 in 40G for performing embodiments of this invention.

The Access Node 42 also includes processing means such as at least one data processor (DP) 42A, storing means such as at least one computer-readable memory (MEM) 42B storing at least one computer program (PROG) 42C, and communication means such as a transmitter TX 42D and a receiver RX 42E for bidirectional wireless communications with the UE 40 on a RAT via one or more antennas 42F. Access Node 42 is also operable such that it can receive, store and transmit the transmit power for Access Node 46 in 42G in accordance with exemplary embodiments of this invention.

Also in FIG. 4 is Access Node 46 operating in a cell different from Access Node 42. The Access Node 46 includes processing means such as at least one data processor (DP) 46A, storing means such as at least one computer-readable memory (MEM) 46B storing at least one computer program (PROG) 46C, and communication means such as a transmitter TX 46D and a receiver RX 46E for bidirectional wireless communications with the UE 40 on a radio access technology via one or more antennas 46F. Access Node 46 is also operable such that it can store its transmit power 46G for transmitting same in accordance with exemplary embodiments of these teachings. Access Node 46 may be a low-power node such as a pico eNB, a femto cell, and a relay node, a wireless local area network (LAN) access point, a low power node, a remote radio unit, a remote radio head, a home eNB, a relay node and a generic small cell base station.

While not particularly illustrated for the UE 40 or either of the Access Node 42 or Access Node 46, those devices are also assumed to include as part of their wireless communicating means a modem and/or a chipset which may or may not be inbuilt onto an RF front end chip within those devices 40, 42, and 46 and which also operates according to the radio access technologies set forth above.

At least one of the PROGs 40C in the UE 40 is assumed to include a set of program instructions that, when executed by the associated DP 40A, enable the device to operate in accordance with the exemplary embodiments of this invention, as detailed above. The Access Node 42 also has software stored in its MEM 42B to implement certain aspects of these teachings. Further, the Access Node 46 may also have implementing software to put into effect the teachings herein as detailed above. In these regards the exemplary embodiments of this invention may be implemented at least in part by computer software stored on the MEM 40B, 42B, and 46B which is executable by the DP 40A of the UE 40 and/or by the DP 42A of the Access Node 42, and/or by the DP 46A of the Access Node 46; or by hardware, or by a combination of tangibly stored software and hardware (and tangibly stored firmware) in any one or more of these devices 40, 42, 46. Electronic devices implementing these aspects of the invention need not be the entire devices as depicted at FIG. 4 or may be one or more components of same such as the above described tangibly stored software, hardware, firmware and DP, or a system on a chip SOC or an application specific integrated circuit ASIC. More specifically, the method 200 may be implemented at the UE 40 and the method 300 may be implemented at least in part at the access nodes 42 and 46.

In general, the various embodiments of the UE 40 can include, but are not limited to personal portable digital devices having wireless communication capabilities, including but not limited to cellular and other mobile phones, navigation devices, laptop/palmtop/tablet computers, digital cameras and music devices, and Internet appliances.

Various embodiments of the computer readable MEMs 40B, 42B, 46B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 40A, 42A, 46A include but are not limited to general purpose computers, special purpose computers, microprocessors, digital signal processors (DSPs) and multi-core processors.

Various modifications and adaptations to the foregoing exemplary embodiments of this invention may become apparent to those skilled in the relevant arts in view of the foregoing description. While the exemplary embodiments have been described above in the context of the LTE/LTE-A (or UTRAN) systems, as noted above the exemplary embodiments of this invention are not limited for use with only these particular types of wireless radio access technology networks.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method for a user equipment (UE) to manage measurement event trigger criteria, the method comprising:
    determining a first pathloss for a serving cell and a second pathloss for at least one neighbor cell;
    adjusting the measurement event trigger criteria based on at least one of the determined first pathloss, the determined second pathloss and a weight factor received from the serving cell; and
    triggering a measurement event based on the adjusted measurement event trigger criteria, wherein
    the weight factor is set by an associated network to weight an uplink coverage based at least on an uplink link transmission power of a signal received by at least one of the serving cell and the neighbor cell.

2. The method of claim 1, wherein:
    if the serving cell is a Wide Band Code Division Multiple Access (WCDMA) cell, determining the first pathloss comprises considering a power difference defined by a Common Pilot Channel (CPICH) transmit (Tx) power-a CPICH-received power, where the CPICH-received power CPICH received power is received and measured at the UE, or
    if the serving cell is a Long Term Evolution (LTE) cell, determining the first pathloss comprises considering a power difference defined by a reference-signal power-a Reference Signal Receiving Power (RSRP) wherein the RSRP is an average power of Resource Element (RE) carrying cell specific Reference Signals (RS) over an entire bandwidth and is measured at the UE.

3. The method of claim 1, wherein determining the second pathloss for at least one neighbor cell comprises one of:
    evaluating a power difference that is defined by a Common Pilot Channel (CPICH) transmit (Tx) power-a CPICH-received power, if the neighbor cell is a Wide Band Code Division Multiple Access (WCDMA) cell; and
    evaluating a power difference defined by a reference-signal power-a Reference Signal Receiving Power (RSRP) if the neighbor cell is a Long Term Evolution (LTE) cell.

4. The method of claim 1, wherein adjusting the measurement event criteria comprises applying the weight factor and at least one of the first pathloss and the second pathloss to a second uplink carrier if the UE supports a 2-uplink carrier aggregation comprising a primary frequency and a secondary frequency.

5. The method of claim 1, wherein adjusting measurement event trigger criteria comprises considering other parameters including a measured uplink interference, network coordinated values, and information from neighbor cell system information.

6. The method of claim 1, wherein the weight factor is set by an associated network to weight the uplink coverage based on a known uplink coverage and a known interference, and is received from the serving cell.

7. An apparatus for a user equipment (UE) to manage measurement event trigger criteria, the apparatus comprising:
    circuitry configured to
        determine a first pathloss for a serving cell and a second pathloss for at least one neighbor cell;
        adjust the measurement event trigger criteria based on at least one of the determined first pathloss, the determined second pathloss and a weight factor received from the serving cell; and
        trigger a measurement event based on the adjusted measurement event trigger criteria, wherein
    the weight factor is set by an associated network to weight an uplink coverage based at least on an uplink link transmission power of a signal received by at least one of the serving cell and the neighbor cell.

8. The apparatus of claim 7, wherein if the serving cell is a Wide Band Code Division Multiple Access (WCDMA) cell, the circuitry is configured to consider a power difference defined by a Common Pilot Channel (CPICH) transmit (Tx) power-a CPICH-received power, wherein the CPICH-received power is received and measured at the UE to determine the first pathloss.

9. The apparatus of claim 8, wherein the CPICH Tx power is broadcast from the serving cell as part of a neighbor list or read from the at least one neighbor cell.

10. The apparatus of claim 7, wherein if the serving cell is a Long Term Evolution (LTE) cell the circuitry is configured to consider a power difference defined by a reference-signal power-a Reference Signal Receiving Power (RSRP) wherein the RSRP is an average power of Resource Elements (RE) carrying cell specific Reference Signals (RS) over an entire bandwidth and is measured at the UE to determine the first pathloss.

11. The apparatus according to claim 7, wherein the circuitry is configured to:
   evaluate a power difference defined by a CPICH Tx power-a CPICH-received power when the neighbor cell is a Wide Band Code Division Multiple Access (WCDMA) cell to determine the second pathloss for at least one neighbor cell; or
   evaluate a power difference defined by a reference-signal power-a Reference Signal Receiving Power (RSRP) when the neighbor cell is a Long Term Evolution (LTE) cell to determine the second pathloss for at least one neighbor cell.

12. The apparatus of 7, wherein the circuitry is configured to apply the weight factor and at least one pathloss to a second uplink carrier if the UE supports a 2-uplink carrier aggregation comprising a primary frequency and a secondary frequency to adjust the measurement event criteria.

13. The apparatus of claim 12, wherein the second uplink carrier is one of
   a same frequency as the primary frequency and the measurement is an intra-frequency measurement; or
   a different frequency from the primary frequency and the measurement is an inter-frequency measurement.

14. The apparatus of claim 7, wherein the circuitry is configured to consider other parameters including a measured uplink interference and information from neighbor cell system information, in order to adjust the measurement event trigger criteria.

15. The apparatus of claim 7, wherein the weight factor is set by an associated network to weigh the uplink coverage based a known uplink coverage and a known interference, and is received from the serving cell.

16. The apparatus of claim 7, wherein the circuitry is configured to cause the UE in a connected mode to report to the detected neighbor cell once the measurement event trigger criteria are met.

17. The apparatus of claim 7, wherein circuitry is configured to adjust the trigger criteria based on a product of the first pathloss and the weight factor or a product of the second pathloss and the weight factor.

18. The apparatus of claim 7, wherein the weight factor is set based on a quality of service requirement corresponding to an uplink signal transmitted from the UE.

19. The apparatus of claim 7, wherein the weight factor is set based on at least one of a known or measure coverage of the serving cell.

20. A computer-readable memory tangibly storing a set of instructions, which, when executed by a user equipment (UE), causes the UE to:
   determine a first pathloss for a serving cell and a second pathloss for at least one neighbor cell;
   adjust the measurement event trigger criteria based on at least one of the determined first pathloss, the determined second pathloss and a weight factor X received from the serving cell; and
   trigger a measurement event based on the adjusted measurement event trigger criteria, wherein
   the weight factor is set by an associated network to weight an uplink coverage based at least on an uplink link transmission power of a signal received by at least one of the serving cell and the neighbor cell.

* * * * *

UNITED STATES PATENT AND TRADEMARK OFFICE
CERTIFICATE OF CORRECTION

PATENT NO. : 9,801,105 B2
APPLICATION NO. : 14/273965
DATED : October 24, 2017
INVENTOR(S) : Keiichi Kubota et al.

Page 1 of 1

It is certified that error appears in the above-identified patent and that said Letters Patent is hereby corrected as shown below:

On the Title Page

Item (30) is missing, please insert:
--(30) Foreign Application Priority Data
May 10, 2013 (GB) 1308468.6--.

In the Claims

Column 10, Line 7, before "is" delete "CPICH received power".

Column 11, Line 20, change "7" to --claim 7--;
    Line 34, after "information," delete "in order".

Column 12, Line 3, after "based" insert --on--.

Signed and Sealed this
Twenty-eighth Day of May, 2019

Andrei Iancu
*Director of the United States Patent and Trademark Office*